(12) United States Patent
Liebig et al.

(10) Patent No.: US 7,289,137 B2
(45) Date of Patent: Oct. 30, 2007

(54) METHOD AND TEST FORM FOR EQUALIZING THE EXPOSURE HEADS IN AN EXPOSER FOR PRINTING ORIGINALS

(75) Inventors: Norbert Liebig, Felm (DE); Rainer Müllenhagen, Kiel (DE); Stefan Schmidt, Kiel (DE); Gerhard Vogler, Stubbendorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 262 days.

(21) Appl. No.: 11/062,998

(22) Filed: Feb. 22, 2005

(65) Prior Publication Data

US 2005/0185161 A1   Aug. 25, 2005

(30) Foreign Application Priority Data

Feb. 19, 2004   (DE) ...................... 10 2004 008 074

(51) Int. Cl.
  *B41J 2/47* (2006.01)
(52) U.S. Cl. ..................................... 347/253
(58) Field of Classification Search ................ 347/133, 347/236–237, 240, 246–247, 251–254; 358/1.9–3.1, 358/3.23, 406, 504, 518; 399/15, 39–51; 356/402
  See application file for complete search history.

(56) References Cited

U.S. PATENT DOCUMENTS

| | | | |
|---|---|---|---|
| 5,323,179 A | | 6/1994 | Sanger et al. |
| 5,598,272 A | * | 1/1997 | Fisch et al. .................. 358/1.9 |
| 5,638,117 A | | 6/1997 | Engeldrum et al. |
| 5,933,578 A | * | 8/1999 | Van de Capelle et al. ... 358/1.9 |
| 6,034,711 A | * | 3/2000 | Trask et al. .................. 347/240 |
| 6,128,090 A | * | 10/2000 | hunsel et al. ............... 356/402 |
| 6,215,562 B1 | * | 4/2001 | Michel et al. ............... 358/1.9 |
| 6,556,793 B2 | * | 4/2003 | Nakamura .................... 399/15 |
| 6,618,158 B1 | | 9/2003 | Brown et al. |
| 6,721,061 B1 | * | 4/2004 | Allen .......................... 358/1.9 |
| 2002/0033966 A1 | | 3/2002 | Lee et al. |
| 2003/0112455 A1 | * | 6/2003 | Ueda et al. .................. 358/1.9 |

FOREIGN PATENT DOCUMENTS

| | | |
|---|---|---|
| EP | 0 529 530 B1 | 3/1993 |
| EP | 1 027 679 B1 | 8/2000 |
| WO | 00/36819 | 6/2000 |

\* cited by examiner

*Primary Examiner*—Hai Pham
(74) *Attorney, Agent, or Firm*—Laurence A. Greenberg; Werner H. Stemer; Ralph E. Locher (57) ABSTRACT

A method and a test form for equalizing exposure heads of an exposer recording printing originals onto a recording material with exposure heads, with regard to the area coverage recorded. Each head contains a laser module generating a laser beam and focusing it onto the material. Each head records a recording band, the laser beams sweeping over the recording material in a main scanning direction while the heads are moved along the material in a secondary scanning direction. A test exposure is carried out, in which each head records a test form having test areas and a background area in its recording band. The area coverage recorded of the background area is compared visually with area coverages recorded of test areas of an adjacent test form and, from differences thereof in adjacent test forms, corrective values for the laser power of the laser modules in the exposure heads are calculated.

15 Claims, 5 Drawing Sheets

| Line | | Module 1 | Module 2 | Module 3 | Module 4 | Module 5 | Module 6 |
|---|---|---|---|---|---|---|---|
| 1 | Test Area with Smallest Density Step from Preceding Module | ------ | 69.5% | 70.5% | 70.5% | 69.5% | 69.0% |
| 2 | Difference from Preceding Module | 0% | -0.5% | +0.5% | +0.5% | -0.5% | -1.0% |
| 3 | Accumulated Difference | 0% | -0.5% | 0% | +0.5% | 0% | -1.0% |
| 4 | Accumulated Difference with Offset | -0.5% | -1.0% | -0.5% | 0% | -0.5% | -1.5% |
| 5 | Change in Laser Power | +1.8 mW | +3.6 mW | +1.8 mW | 0 mW | +1.8 mW | +5.4 mW |

FIG. 8

METHOD AND TEST FORM FOR EQUALIZING THE EXPOSURE HEADS IN AN EXPOSER FOR PRINTING ORIGINALS

BACKGROUND OF THE INVENTION

Field of the Invention

The invention pertains to the field of electronic reproduction technology and relates to a method for equalizing the exposure heads of an exposer, in particular, an external drum exposer, which records printing originals on printing plates. Furthermore, the invention relates to a test form for measuring and for comparing the exposure intensities set in the exposure heads.

In reproduction technology, printing originals for printed pages that contain all the elements to be printed such as texts, graphics, and images are produced. For color printing, a separate printing original is produced for each printing ink and contains all the elements that are printed in the respective color. For four-color printing, these are the printing inks cyan (C), magenta (M), yellow (Y), and black (K). The printing originals separated in accordance with printing inks are also referred to as color separations. The printing originals are generally scanned and, by using an exposer, are exposed onto films, with which printing plates for printing large editions are, then, produced. Alternatively, the printing originals can also be exposed directly onto printing plates in special exposure devices, or they are transferred directly as digital data to a digital press. There, the printing-original data is, then, exposed onto printing plates, for example, with an exposing unit integrated into the press, before the printing of the edition begins immediately thereafter.

According to the current prior art, the printing originals are reproduced electronically. In such a case, the images are scanned in a color scanner and stored in the form of digital data. Texts are generated with text processing programs and graphics with drawing programs. Using a layout program, the image, text, and graphic elements are assembled to form a printed page. The data from a plurality of printed pages is combined with data from further elements, such as register crosses, cutting marks and folding marks and print control fields, to form printing originals for a printed sheet. Following the separation into the printing inks, the printing originals are, then, present in digital form. The data formats largely used nowadays to describe the printing originals are the page description languages PostScript and PDF (portable document format). In a first step, the PostScript or PDF data is converted in a raster image processor (RIP) into color separation values for the color separations C, M, Y, and K before the recording of the printing originals. In the process, for each image point, four color separation values are produced as tonal values in the value range from 0 to 100%. The color separation values are a measure of the color densities with which the four printing inks cyan, magenta, yellow, and black have to be printed on the printing material. In special cases, in which printing is carried out with more than four colors, each image point is described by as many color separation values as there are printing inks. The color separation values can be stored, for example, as a data value with 8 bits for each image point and printing ink, with which the value range from 0% to 100% is subdivided into 256 tonal value steps.

Different tonal values of a color separation to be reproduced may be reproduced in the print only by area modulation of the printing inks applied, that is to say, by screening. The area modulation of the printing inks can be carried out, for example, in accordance with a halftone method, in which the various tonal value steps of the color separation data are converted into halftone dots of different size, which are disposed in a regular pattern with periodically repeating halftone cells. A halftone cell for a typical #60 screen includes a square with ¹⁄₆₀ cm edge length, i.e., a halftone cell has the dimensions 166 µm×166 µm. During the recording of the color separations on a printing plate, the halftone dots in the individual halftone cells are assembled from exposure points that are an order of magnitude smaller than the halftone dots. A typical resolution of the exposure points is, for example, 1000 exposure points per centimeter, that is to say, an exposure point has the dimensions 10 µm×10 µm. Conversion of the color separation values into halftone dots takes place in a second step during the further processing of the color separation data in the raster image processor. As a result, the color separation data is converted into high-resolution binary values with only two lightness values (exposed or not exposed) that form the pattern of the modulated dot grid. As such, the printing original data of each color separation is described in the form of a high-resolution halftone bitmap that, for each of the exposure points on the printed area, contains a bit that indicates whether this exposure point is to be exposed or not. In this way, the tonal values are converted into a corresponding area coverage on the printing original that, like the tonal values, is specified in percent. The area coverage indicates what percentage of the area of a raster cell is exposed.

In the recording devices that are used in electronic production technology for the exposure of printing originals and printing forms, an exposure beam is generated, for example, a laser beam is generated by a laser diode, shaped by optical measures and focused on to the recording material and deflected over the recording material point-by-point and line-by-line by a deflection system. There are also recording devices that, to increase the exposure speed, produce a bundle of laser beams, for example, with a separate laser diode for each laser beam, and expose a plurality of image lines of the printing form simultaneously each time they sweep across the recording material. The printing forms can be exposed onto the film material so that what are referred to as color separation films are produced, which are, then, used for the production of printing plates by a photographic copying process. Instead, the printing plates, themselves, can also be exposed in a plate exposer or directly in a digital press, into which a unit for exposing plates is integrated. The recording material can be located on a flat surface (flatbed exposer), in a cylindrical hollow (internal drum exposer) or on a drum (external drum exposer).

Flatbed exposers operate for the most part with a rapidly rotating polygonal mirror, whose mirror surfaces deflect the laser beam transversely over the recording material, while, at the same time, the recording material is moved at right angles to the deflection direction of the laser beam. As such, exposure is carried out recording line-by-recording line. Because, during the movement of the laser beam over the recording material, the length of the light path changes, complicated imaging optics that compensate for the change in size of the exposure point caused thereby are needed.

In the case of an internal drum exposer, the material to be exposed is mounted on the inner surface of a partly open hollow cylinder and exposed with a laser beam that is aimed along the cylinder axis onto a deflection device that reflects the laser beam perpendicularly onto the material. The deflection device, a prism, or a mirror, rotates at high speed during operation and, and the same time, is moved in the direction of the cylinder axis so that the deflected laser beam describes circular or helical recording lines on the material.

In the case of an external drum exposer, the material to be exposed, in the form of films or printing plates, is mounted on a drum mounted such that it can rotate. As the drum rotates, an exposure head is moved axially along the drum at a relatively short distance. The exposure head is moved in the feed direction by a feed spindle, to which it is connected by a form fit and which is set rotating by a feed drive. The exposure head focuses one or more laser beams onto the drum surface, sweeping over the drum surface in the form of helices. As such, during each drum revolution, one or more recording lines are exposed onto the recording material.

To shorten the exposure time and, therefore, to increase the economy of the exposer, external drum exposers are, preferably, operated with a bundle of N laser beams that, by exposure optics, image a linear array of exposure points on the surface of the recording material, oriented in the axial direction of the exposure drum. If there is a plurality of the exposure heads, the exposure heads are disposed, for example, on an exposure head carrier, which is connected to the feed spindle so that, as a result of the rotational movement of the feed spindle, all the exposure heads are moved jointly along the exposure drum in the feed direction. The exposure heads are disposed in the axial direction of the exposure drum at a distance that is a fraction of the axial drum length, for example, in the case of three exposure heads, one third of the axial drum length. To record a printing original over the entire drum length, the exposure head carrier needs to be moved by the feed spindle only over a distance that corresponds to the spacing of the exposure heads. Each exposure head then exposes only one recording band of the printing original. Correspondingly, the recording time for the printing original is short.

At the boundary between the recording bands that are recorded by the different exposure heads, the area coverages produced must also be equal within a small tolerance if the exposure heads are driven with two respectively equal tonal values. Otherwise, a disruptive density step is produced, to which the eye is particularly sensitive in a uniform area of equal total value. In the case of a constant tonal value, the area coverage produced can be influenced within certain limits by changing the optical power of the laser beams in the exposure heads. As such, the exposure heads can be equalized with one another such that no density step is produced at the transition from one recording band to the next.

In principle, such equalization between two adjacent exposure heads could be carried out by an interactive method, in which the laser power of one exposure head remains unchanged and that of the other exposure head is changed step-by-step. Each time, an area with the same total value is recorded and the recording is assessed visually. This is repeated until no density step is visible any more. Then, in the same way, the next exposure head is equalized and so on. Such a method would be very time-consuming because, for each test exposure, the exposure heads have to pass through a feed distance that corresponds to the width of a recording band. In addition, the consumption of recording material for the test exposure would be very high. The iterative method can be accelerated by an additional density measurement of the area coverages recorded. Because of the capability of the eye to perceive even very small density changes below 0.5% and, secondly, a typical measurement error of more than 1%, however, such a measurement and a change in the laser power calculated from this are not sufficient on their own for optimal equalization. The measured results can, at best, be used to find beneficial starting values for the iterations.

European Patent 0 529 530 B1 describes a method for calibrating a multichannel printer that uses a plurality of laser diodes to generate parallel laser beams and focuses them onto a thermal recording material. Using each laser diode, a test pattern is written separately, the laser diodes being driven with known tonal values and the density of the test patterns being measured. From the comparison of the measured densities with the input tonal values, corrected drive values, with which all the laser diodes produce the same density value, are calculated.

European Patent 1 027 679 B1, corresponding to U.S. Pat. No. 6,618,158 to Brown et al., proposes a method and an apparatus for calibrating an image generating device having a plurality of image outputs. The image outputs are pulsed laser diodes, which are driven with a variable laser current and a variable pulse duration in order to produce different densities on a recording medium. Using each laser diode, a test pattern having a plurality of test areas of different intended densities is exposed, and the recorded density of the test areas is then measured. For each set of test areas with the same intended density, a response function is formed, which relates the recording density with the laser current and the pulse duration. Based upon the difference between the measured densities and the densities calculated in accordance with the response function, the drive values for the individual laser diodes are corrected, the recorded density variations between the laser diodes being reduced.

The previously known methods for equalizing the exposure heads of an exposer are time-consuming or they cannot reach the high accuracy required for the application in a printing original exposer.

SUMMARY OF THE INVENTION

It is accordingly an object of the invention to provide a method and test form for equalizing the exposure heads in an exposer for printing originals that overcome the hereinaforementioned disadvantages of the heretofore-known devices and methods of this general type and that operates with less expenditure of time and is reliable and sufficiently accurate, and provides a test form with which the area coverages recorded by the individual exposure heads can be compared in a simple manner.

In each case, a test form is exposed in each recording band that is associated with an exposure head, and the area coverages recorded in mutually adjacent recording bands are compared visually. Without any density measurement, the test form permits very accurate quantifying of the differences of the area coverages recorded, from which appropriate corrective values for the laser powers in the exposure heads are derived. By the method of the present invention, the necessary corrective values for all the exposure heads can be determined simultaneously with one test exposure. Therefore, the complete equalization of the exposure heads can be achieved with only a few iteration steps.

With the foregoing and other objects in view, there is provided, in accordance with the invention, a method for equalizing exposure heads of an exposer that records printing originals onto a recording material using the exposure heads, each exposure head having a laser module, the method including the steps of generating with each exposure head at least one laser beam and focusing the at least one laser beam onto the recording material, sweeping the at least one laser beam of the exposure heads over the recording material in a main scanning direction while moving the exposure heads along the recording material in a secondary scanning direction, recording a recording band with each exposure head, and, with regard to an area coverage recorded carrying out a test exposure in which each exposure head records a test form having test areas and a background area in the recording band of the respective exposure head, visually comparing the area coverage recorded of the background area of a test form with area coverages recorded of the test areas of an adjacent test form, and calculating from the differences of the area coverages in adjacent test forms corrective values for the laser power of the laser modules in the exposure heads.

With the objects of the invention in view, there is also provided a method for equalizing exposure heads of an exposer that records printing originals onto a recording material with the exposure heads, the method including the steps of generating with each a laser module of each exposure head at least one laser beam and focusing the at least one laser beam onto the recording material, sweeping the at least one laser beam of the exposure heads over the recording material in a main scanning direction while moving the exposure heads along the recording material in a secondary scanning direction, recording a recording band with each exposure head over a coverage area, carrying out, in the coverage area, a test exposure in which each exposure head records a test form having test areas and a background area in the recording band of the respective exposure head, visually comparing the area coverage recorded of the background area of a test form with area coverages recorded of the test areas of an adjacent test form, and correcting the laser powers of the exposure heads by calculating from the differences of the area coverages in adjacent test forms corrective values for the laser power of the laser modules in the exposure heads and applying the corrective values for the laser power of each of the laser modules in the exposure heads.

In accordance with another mode of the invention, the test areas of a test form and the background area of an adjacent test form adjoin one another directly.

In accordance with a further mode of the invention, the test exposure is carried out by directly adjoining the test areas of a test form and the background area of an adjacent test form.

In accordance with an added mode of the invention, the test areas and the background area of a test form are screened by frequency-modulated screening.

In accordance with an additional mode of the invention, there are provided the steps of screening the background area of a test form with a first tonal value and screening the test areas of the same test form with tonal values varying in small steps around the first tonal value.

In accordance with yet another mode of the invention, the first tonal value is set to be 70.0% and the tonal values of the test areas are varied in steps of 0.5% in a range from approximately 65% to approximately 75%.

In accordance with yet a further mode of the invention, the test exposure and the correction of the laser powers are iteratively repeated until the area coverages recorded in all of the test forms of a test exposure are equal.

In accordance with yet an added mode of the invention, the test exposure, the visual comparison, and the calculating steps are iteratively repeated until the area coverages recorded in all of the test forms of a test exposure are equal.

In accordance with yet an additional mode of the invention, for further iterations of the test exposure, a test form is utilized in which total value steps between the test areas are smaller than for the first test exposures.

With the objects of the invention in view, there is also provided a test form for equalizing exposure heads of an exposer that records printing originals onto a recording material utilizing the exposure heads, including exposure heads, each of the exposure heads having a laser module generating at least one laser beam and focusing the at least one laser beam onto the recording material, the at least one laser beam of the exposure head sweeping over the recording material in a main scanning direction while the exposure heads are moved along the recording material in a secondary scanning direction; and each of the exposure heads recording a recording band in a coverage area, screening a background area with a first tonal value, and screening test areas with tonal values varying in steps around the first tonal value.

With the objects of the invention in view, in an exposer recording printing originals onto a recording material with exposure heads over a coverage area, there is also provided a test form for equalizing the exposure heads including exposure heads, each of the exposure heads having a laser module generating at least one laser beam and focusing the at least one laser beam onto the recording material, the at least one laser beam of the exposure head sweeping over the recording material in a main scanning direction while the exposure heads are moved along the recording material in a secondary scanning direction, and each of the exposure heads recording a recording band in the coverage area, the exposure heads screening a background area with a first tonal value and screening test areas with tonal values varying in steps around the first tonal value.

In accordance with again another feature of the invention, the first tonal value is approximately 70.0% and the tonal values of the test areas vary in steps of approximately 0.5% in a range from approximately 65% to approximately 75%.

The background area of a test form is screened with a first tonal value and the test areas of the same test form are screened with tonal values that vary in small steps around the first tonal value. The test areas are disposed at one edge of the test form, which runs in the main scanning direction, and the test areas are narrower than the width of the test form in the secondary scanning direction. As a result, the test areas of a test form and the background area of an adjacent test form adjoin one another directly and can more easily be compared visually.

In accordance with a concomitant feature of the invention, the test areas and the background area are screened by frequency-modulated screening.

Other features that are considered as characteristic for the invention are set forth in the appended claims.

Although the invention is illustrated and described herein as embodied in a method and test form for equalizing the exposure heads in an exposer for printing originals, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
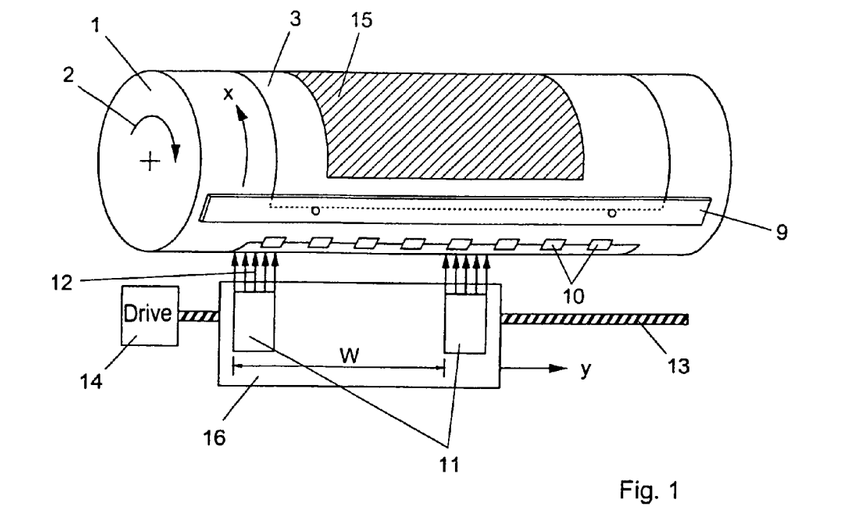
FIG. 1 is a diagrammatic perspective view of a structure of an external drum exposer according to the invention.

Referring now to the figures of the drawings in detail and first, particularly to FIG. 1 thereof, there is shown in schematic form the structure of an external drum exposer for exposing the printing original 15 on to a recording material, onto a printing plate 3 in this example. An exposure drum 1 is rotatably mounted and, by a rotational drive, not shown, can be set rotating uniformly in the direction of the rotation arrow 2. On the exposure drum 1, an unexposed printing plate 3 is fixed at the leading edge by a clamping bar 9 and at the trailing edge by clamping pieces 10. The printing plate 3 is held flat on the drum surface by a vacuum device, not shown in FIG. 1, which sucks the printing plate 3 thereon through holes in the drum surface so that the printing plate 3 is not detached by the centrifugal forces during the rotation of the exposure drum 1.

A plurality of exposure heads 11, which are disposed on a common exposure head carrier 16, are moved axially along on the exposure drum 1 at a relatively short distance as the exposure drum 1 rotates. Each exposure head 11 focuses a bundle of exposure beams, N laser beams 12 in this example, onto the drum surface, sweeping over the drum surface in the form of helices. As such, during the drum rotation, one or a plurality of groups of N recording lines are recorded on the recording material in the circumferential direction x (main scanning direction). The exposure head carrier 16 is moved in the feed direction y (secondary scanning direction) by a feed spindle 13, to which it is connected through a form fit and which is set rotating by a feed drive 14. The feed drive 14 is a stepping motor, it being possible for the feed speed to be set accurately with the frequency of the stepping motor cycles supplied to the motor.

By using a plurality of exposure heads 11, the productivity of the exposer is increased, in particular, for the exposure of large-format printing plates 3 because a printing plate 3 can be exposed in a shorter time. In the example of FIG. 1 there are two exposure heads 11, which are disposed at the distance W in the feed direction and in each case focus a bundle of N laser beams 12 onto the printing plate 3. As a result, the printing plate 3 is exposed simultaneously with two groups of recording lines, which sweep over the drum surface at the axial spacing W. In the case of two exposure heads 11, the distance W corresponds to half the maximum length that the exposer can record in the feed direction; in the case of three exposure heads 11 one third of this maximum length, and so on. After the exposure head carrier 16 and, thus, all the exposure heads 11 have covered the feed distance W, the exposure of the printing plate 3 has been completed, regardless of the format of the printing original 15 recorded. The more exposure heads 11 there are, the shorter is the feed distance W and, therefore, the exposure time that is used for the recording.

Figure 2:
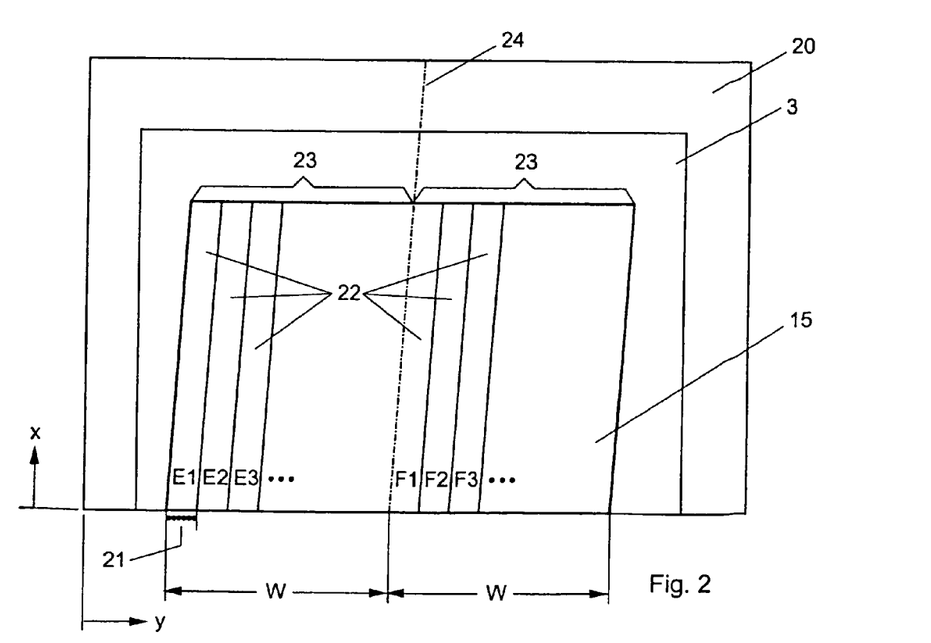
FIG. 2 is a diagrammatic illustration of a recorded printing original on an unwound drum surface according to the invention.

FIG. 2 illustrates the recording of the printing original 15 that results during the exposure with N laser beams 12 in each case, on the unwound drum surface 20. The printing plate 3 on which the printing original 15 is recorded is clamped onto the drum surface 20. The recording is carried out in each case in parallel by using N laser beams 12, which are imaged as a linear array of exposure points 21 oriented in the feed direction. The number of exposure points 21 in the array is, for example, N=64. If the exposure drum 1 rotates, the first exposure head 11 exposes the recording strips 22 of in each case N parallel recording lines, which are designated E1, E2, E3, and so on in FIG. 2. Using the second exposure head 11, further recording strips 22 are exposed simultaneously at the distance W and are designated F1, F2, F3, and so on in FIG. 2. Each exposure head 11 exposes a separate recording band 23, which is in each case composed of the recording strips 22. The feed speed of the exposure head 11 is set such that, following a drum revolution, it has been moved in the feed direction by the width of a recording strip 22, so that the recording strips 22 exposed during each drum revolution adjoin one another seamlessly. In another mode of operation, what is referred to as the interleave writing method, the laser beams are not imaged as N exposure points at the spacing of one recording line width in each case but at a greater spacing that corresponds to a multiple of the width of a recording line. Given suitable combinations of line number N and line spacing, in successive drum revolutions the gaps between the initially exposed recording lines are gradually filled with further recording lines so that, ultimately, gap-free exposure of the recording material is, nevertheless, carried out.

At the end of the feed travel W, the last recording line of the first recording band 23 adjoins the first recording line of the second recording band 23 at the recording line boundary 24. At this boundary, it is possible for visible density steps to occur if, in the case of a constant tonal value, the area coverages recorded by the adjacent exposure heads 11 do not coincide exactly. The eye is particularly sensitive to such density steps in a uniform area of equal tonal value because even very small density changes below 0.5% can be perceived. The density steps are caused by it been possible for the exposure points 21 focused on to the recording material by the laser beams 12 in the various exposure heads 11 to have slightly different diameters. These differences can be equalized by appropriate adaptation of the laser power.

Figure 3:
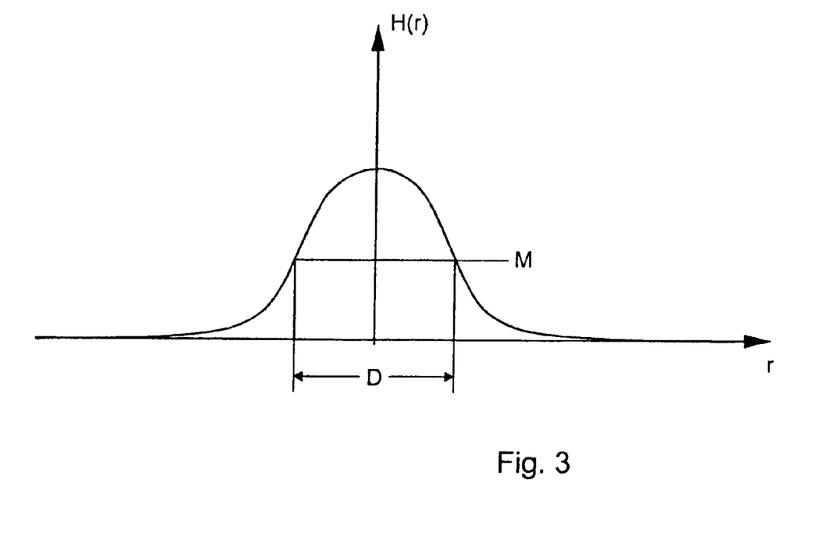
FIG. 3 is a graph illustrating a beam profile of a laser beam.

During the exposure of the printing originals, the halftone dots are assembled from many small exposure points, for example, with a resolution of 1000 exposure points/cm. To achieve this resolution, the recording lines must have a spacing a=10 µm. Whether or not the diameter of the exposure point likewise has to be set to D=10 µm depends on the beam profile of the laser beam and on the exposure characteristics of the recording material. The beam profile of a laser diode has the form of a Gauss bell curve, as shown in FIG. 3. The energy density H(r) has a maximum value in the center of the beam and falls off with increasing radius r in accordance with a Gauss function.

Figure 4A:
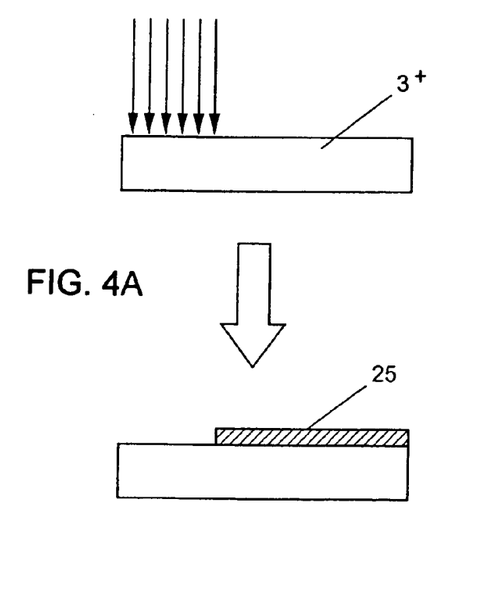
FIGS. 4A and 4B are diagrammatic illustrations of a mode of action of a positive and a negative printing plate, respectively.
Figure 4B:
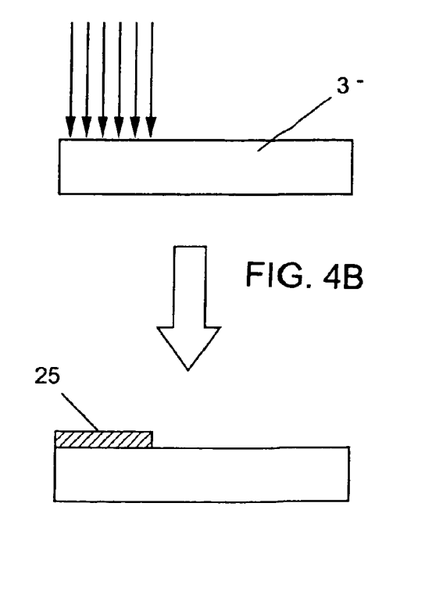

For further explanation of an exemplary embodiment of the invention, it will be assumed that the printing original is recorded on what is referred to as a thermal printing plate, in which a polymer layer is destroyed and removed in accordance with an image by the action of the laser energy. The remaining regions of the polymer layer are, later, the ink-carrying regions in the press, that is to say, they pick up the printing ink and transfer it to the printing material. Such a printing plate is a positive printing plate because the points that do not carry ink are exposed in accordance with an image. The designation "positive" is derived from the comparison with the conventional recopying of a positive color separation onto a printing plate, in which the printing plate is exposed through the transparent film regions, that is to say, also at the points that do not carry ink. Thermal printing plates that are exposed directly with a laser have a threshold characteristic, that is to say, the polymer layer is destroyed when the energy density H(r) exceeds a threshold value M, and the polymer layer is maintained at a lower energy density (FIG. 3). From this, it results directly that the diameter D of the exposure points 21 can be enlarged if the laser energy is increased, and that the diameter D of the exposure points 21 is made smaller when the laser energy is reduced. Because this is a positive printing plate, the area coverage of the ink-carrying regions changes inversely with respect to the change in the diameter D so that the area coverage is, therefore, reduced by an increase in the laser energy and is increased by a reduction in the laser energy. For the Kodak Polychrome Graphics Electra Excel printing plate, for example, measurements have shown that the laser energy must be increased by 3.6 mW to reduce the area coverage by 1%. For other printing plates, somewhat different values result, depending on the light sensitivity of the printing plate and the exact form of the beam profile. In the case of a negative printing plate, in which the ink-carrying points are exposed in accordance with an image, an increase in the laser energy also reflects a corresponding increase in the area coverage recorded. FIG. 4A shows in schematic form the position of the ink-carrying regions 25 of a positive printing plate $3^+$ relative to the exposed points. FIG. 4B shows the same relationship in the case of a negative printing plate $3^-$.

According to the method of the present invention, the corrective values of the laser energy necessary for the equalization of exposure heads 11 are determined by a special test form being recorded simultaneously with all the exposure heads 11 after the laser energies of the laser beams 12 have initially been set to a nominal operating point. A control device, not explained here, ensures that the N laser beams 12 within each exposure head 11 always emit the same laser energy once set. In the following text, the laser units that, in each exposure head 11, generate the N laser beams 12 as an array of exposure points 21, will also be designated a laser module or module. Furthermore, statements such as "changing the laser energy by . . . mW" always relate to all the laser beams 12 of a module, that is to say, the energy of all the laser beams is changed by the same amount.

Figure 5:
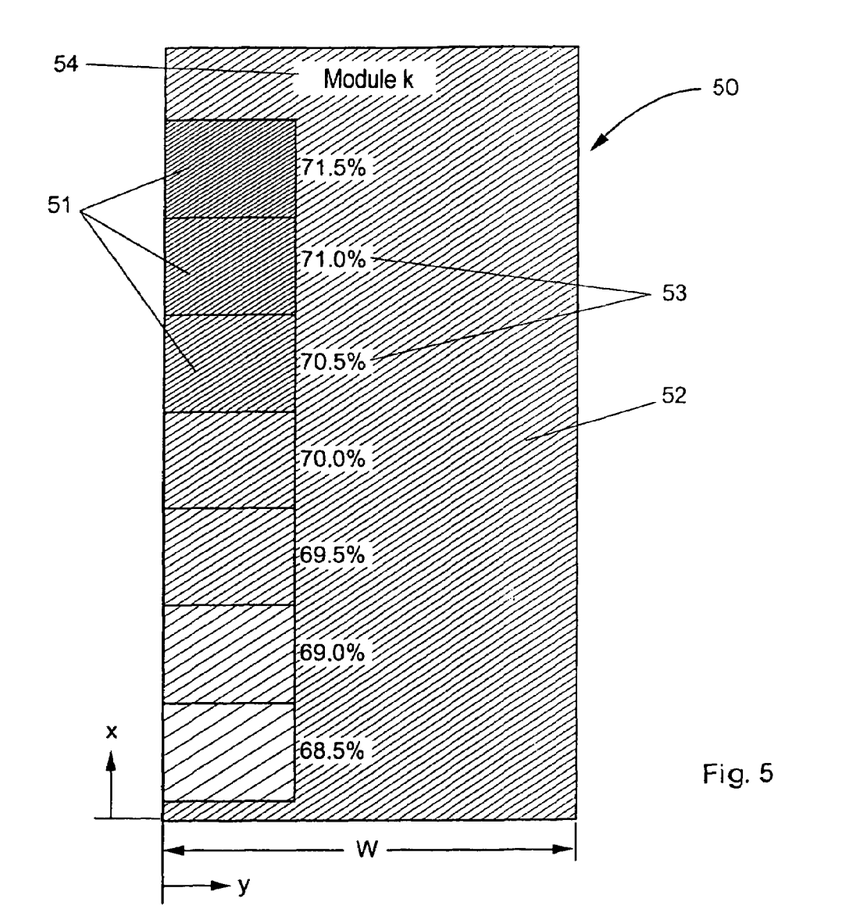
FIG. 5 is a diagrammatic illustration of a structure of a test form according to the invention.

FIG. 5 shows the structure of the test form 50 according to the invention. The test form 50 is exposed over the entire width W of a recording band 23 in the feed direction y. The extent of the test form 50 in the circumferential direction x is arbitrary. The test form 50 contains a plurality of test areas 51 on a background area 52. The background area 52 is screened with a constant tonal value, for example, with the tonal value 70.0%. This tonal value is particularly well suited to the visual assessment of extremely small density differences. One of the test areas 51 is screened with the same tonal value as the background area 52, the remaining test areas 51 are screened with tonal values that deviate in small steps both downward and upward from the tonal value of the background area 52, for example, in steps of 0.5%. The number of test areas 51 is arbitrary, for example, 21 test areas 51 can be provided in the tonal value range from 65% to 75%. In FIG. 5, for improved clarity, only seven test areas 51 are shown. The test areas 51 are disposed immediately at the left-hand edge of the test form 50, that is to say, in the circumferential direction x of the recording. The nominal tonal values of the test areas 51 are identified beside the test areas 51 by tonal value numbers 53, which are also exposed during the recording of the test form 50. Furthermore, at the upper edge of the test form 50, a module designation 54 is also exposed, indicating the laser module with which the test form 50 has been recorded. The different screened tonal values of the test areas 51 and of the background area 52 are identified in FIG. 5 by hatching of different density.

Figure 6A:
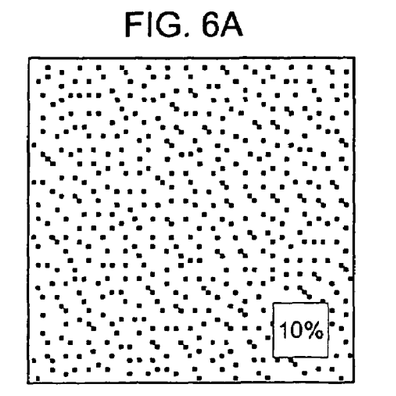
FIGS. 6A and 6B are diagrammatic illustrations of examples of a frequency-modulated screen.
Figure 6B:
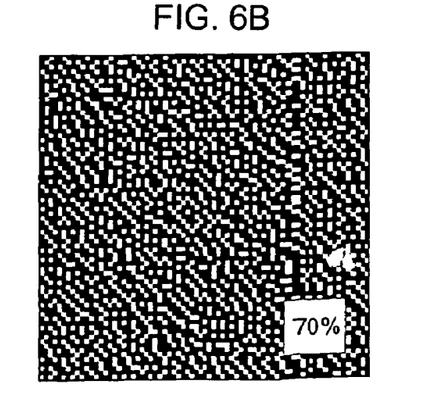

The screening of the test areas 51 and of the background area 52 can be carried out with any desired screening method. However, frequency-modulated screening is preferably used. FIGS. 6A and 6B show examples of this with tonal values of 10% and 70% at great magnification. The screen contains an irregular configuration of very small halftone dots, for example, with a size of 20 µm, whose number increases with increasing tonal value. Their size is not changed here. In the case of tonal values above 50%, more and more halftone dots touch, until ultimately, at high tonal values, a black area is produced, in which small "holes" are scattered irregularly. The frequency-modulated screen reacts more sensitively to changes in the laser power, that is to say, the area coverage recorded changes more sharply than in the case of conventional amplitude-modulated screening, in which halftone dots disposed regularly have their size varied. They are, therefore, better suited to the test form 50, with which setting values for the laser power in exposure heads are determined.

Figure 7:
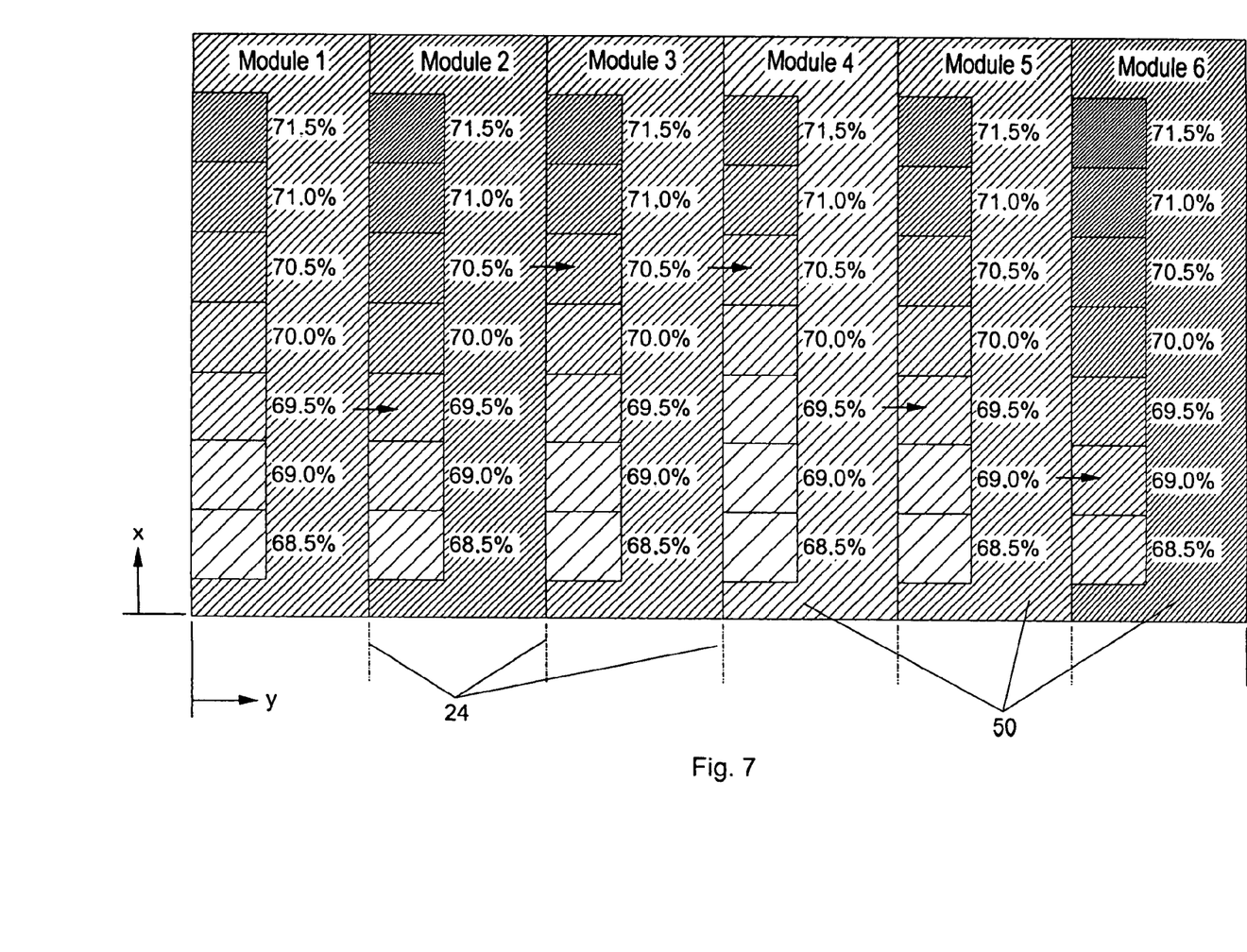
FIG. 7 is a diagrammatic illustration of a test exposure according to the invention having a plurality of test forms.

The test form 50 is recorded simultaneously with all the laser modules of the exposure heads 11. FIG. 7 shows such a test exposure for an example in which there are six exposure heads 11 in an exposer, which are to be equalized with one another. The test exposure, therefore, contains six test forms 50 exposed beside one another in the feed direction y, abutting one another at the recording band boundaries 24. Because the laser powers have not yet been equalized, the test forms 50 are recorded by the laser modules with somewhat different area coverage, which is again identified in FIG. 7 by hatching of different density. In spite of the different area coverages, in all the test forms 50, the test area 51 having the nominal total value 70.0% naturally has the same area coverage as the background area 52 of the same test form 50. At the recording band boundaries 24, in each case the background area 52 of a test form 50 and the test area 51 of the adjacent test form 50 adjoin one another directly. This permits simple visual assessment of the test exposure by the comparison between the background area 52 exposed by one module with the test areas 51 exposed by the adjacent module. The visual comparison is more accurate than a density management, which would be affected by a measurement error of approximately 1% area coverage. In the case of visual comparison, density differences of <0.5% are still perceivable. In the test exposure, the test areas 51 exposed with the module 1 could also be omitted because they are not compared with an adjacent background area 52, that is to say, for the module 1 it would be sufficient to expose only the background area 52.

In the example of FIG. 7 the test form 50 exposed with module 2 has a somewhat higher area coverage than the test form 50 exposed with module 1, that is to say, it is somewhat darker overall. This is expressed by the fact that, in the test form 50 of module 2, the test field 51 with the nominal tonal value 69.5% has already achieved the same area coverage as the background area 52 in the test form 50 of module 1 with the nominal total value 70.0%. For the purpose of improved clarity, this coincidence is identified by an arrow in FIG. 7. The test form 50 of module 3 has been exposed somewhat more brightly overall than the test form 50 of module 2. The area coverage of the background area 52 of module 2 is therefore achieved by module 3 only with the test field 51 with the nominal total value 70.5%. The visual comparison is carried out at each recording band boundary 24 between two modules, and the nominal total values of the test areas 51 whose area coverage in each case coincides with the area coverage of the background of the preceding module or has the smallest difference are entered into the first row of an evaluation table.

Figure 8:
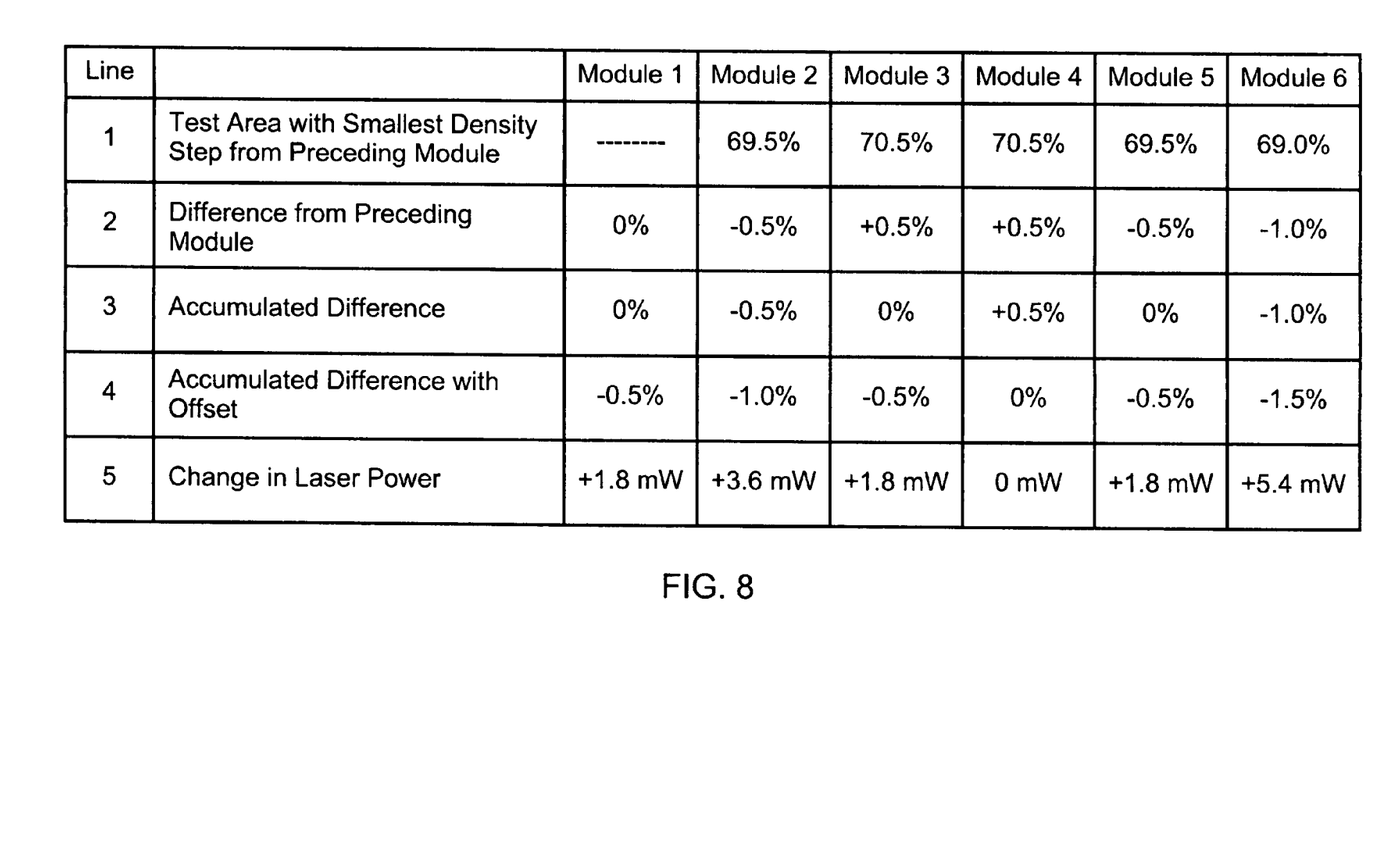
FIG. 8 is a table illustrating an evaluation of the test exposure.

FIG. 8 shows the evaluation table for the test exposure of FIG. 7. In a second line of the evaluation table, the differences of the nominal total values from module 1 from the respective preceding module are formed. These differences are then added up, beginning from module 1 as far as the respective current module, and the sum is entered in a third line of the evaluation table. The values in line 3, thus, indicate what area coverage differences the test forms 50 recorded with the respective modules have in relation to the test form written with module 1. Based upon these differences, corrective values could already be calculated, by which amounts the laser powers of the individual modules have to be increased or decreased to equalize the exposure heads 11 with one another. To avoid the threshold value M, at which the polymer layer of the printing plate is removed reliably and completely (FIG. 3), being undershot in the event of a reduction in the laser power in a module, a common offset value is also subtracted from the values in line 4 of the evaluation table so that no positive differences occur. The difference values provided with the offset are entered in line 5 of the evaluation table. From these difference values, with the knowledge that, for example, an increase in the laser power by 3.6 mW effects a reduction of 1% in the area coverage, the power changes necessary for the equalization can be calculated directly. These corrective values are entered in line 5 of the evaluation table. Using the corrected laser powers, in each case further test exposures are carried out, each time the area coverages of background areas 52 and adjacent test areas 51 again being compared and, from this, new corrective values for the laser powers being calculated. After a few repetitions, typically after three iteration steps, the test forms 50 illuminated with the entire laser modules yield the same area coverages, that is to say, the equalization of the exposure heads 11 has been concluded. The accuracy of the equalization can be increased still further if, for the further iteration steps, use is made of a test form 50 in which the density steps between adjacent test areas 51 are chosen to be smaller, for example, 0.25%.

The method according to the invention has been described using the example of a positive printing plate. Likewise, it can be used for negative printing plates and also for other recording materials, it merely being necessary to note the direction in which the laser powers have to be changed in order, for example, to effect a reduction in the area coverage or which threshold values or other limiting values have to be complied with. The method and the test form 50 are not restricted to the application in an external drum exposer either but can be employed in any configuration of printing original exposer that records a printing original by using a plurality of exposure heads.

This application claims the priority, under 35 U.S.C. § 119, of German patent application No. 10 2004 008 074.7, filed Feb. 19, 2004; the entire disclosure of the prior application is herewith incorporated by reference.

We claim:

1. A method for equalizing exposure heads of an exposer that records printing originals onto a recording material using the exposure heads, each exposure head having a laser module, the method which comprises:
   generating with each exposure head at least one laser beam and focusing the at least one laser beam onto the recording material;
   sweeping the at least one laser beam of the exposure heads over the recording material in a main scanning direction while moving the exposure heads along the recording material in a secondary scanning direction;
   recording a recording band with each exposure head; and
   with regard to an area coverage recorded:
   carrying out a test exposure in which each exposure head records a test form having test areas and a background area in the recording band of the respective exposure head;
   visually comparing the area coverage recorded of the background area of a test form with area coverages recorded of the test areas of an adjacent test form;
   assessing the differences of the area coverages in adjacent test forms by determining a test area of the adjacent test form with the smallest difference of area coverage in comparison to the background area of the first test form;
   calculating from the differences of the area coverages in adjacent test forms corrective values for the laser power of the laser modules in the exposure heads; and
   adjusting the laser power to equalize the exposure heads with one another.

2. The method according to claim 1, wherein the test areas of a test form and the background area of an adjacent test form adjoin one another directly.

3. The method according to claim 1, which further comprises carrying out the test exposure by directly adjoining the test areas off a test form and the background area of an adjacent test form.

4. The method according to claim 1, which further comprises screening the test areas and the background area of a test form by frequency-modulated screening.

5. The method according to claim 1, which further comprises:
   screening the background area of a test form with a first tonal value; and
   screening the test areas of the same test form with tonal values varying in small steps around the first tonal value.

6. The method according to claim 5, which further comprises:
   setting the first tonal value to be 70.0%; and
   varying the tonal values of the test areas in steps of 0.5% in a range from approximately 65% to approximately 75%.

7. The method according to claim 1, which further comprises iteratively repeating the test exposure and the correction of the laser powers until the area coverages recorded in all of the test forms of a test exposure are equal.

8. The method according to claim 7, which further comprises, for further iterations of the test exposure, utilizing a test form in which total value steps between the test areas are smaller than for the first test exposures.

9. The method according to claim 1, which further comprises iteratively repeating the test exposure, the visual comparison, and the calculating steps until the area coverages recorded in all of the test forms of a test exposure are equal.

10. The method according to claim 9, which further comprises, for further iterations of the test exposure, utilizing a test form in which total value steps between the test areas are smaller than for the first test exposures.

11. A method for equalizing exposure heads of an exposer that records printing originals onto a recording material with the exposure heads, the method which comprises:
   generating with each laser module of each exposure head at least one laser beam and focusing the at least one laser beam onto the recording material;
   sweeping the at least one laser beam of the exposure heads over the recording material in a main scanning direction while moving the exposure heads along the recording material in a secondary scanning direction;
   recording a recording band with each exposure head over a coverage area;
   carrying out, in the coverage area, a test exposure in which each exposure head records a test form having test areas and a background area in the recording band of the respective exposure head;
   visually comparing the area coverage recorded of the background area of a test form with area coverages recorded of the test areas of an adjacent test form;
   assessing the differences of the area coverages in adjacent test forms by determining a test area of the adjacent teat form with the smallest difference of area coverage in comparison to the background area of the first test form; and
   correcting the laser powers of the exposure heads by calculating from the differences of the area coverages in adjacent test forms corrective values for the laser power of the laser modules in the exposure heads and applying the corrective values for the laser power of each of the laser modules in the exposure heads.

12. In combination with of an exposer having a plurality of exposure heads for recording printing originals onto a recording material, each of the exposure heads having a respective laser module generating at least one laser beam and focusing the at least one laser beam onto the recording material, the at least one laser beam of each exposure head sweeping over the recording material in a main scanning direction while the exposure heads are moved along the recording material in a secondary scanning direction a test exposure for equalizing the exposure heads, comprising:
   a plurality of test forms each having a respective coverage area with a recording band recorded by a respective exposure head;
   each said recording band abutting adjacent recording bands at recording band boundaries and having a respective background area with a first tonal value and being contained within said test form, said background area configured for being screened;
   said background areas each having a respective test area thereon with tonal values varying in steps around said first tonal value, said test area adjoining said background area of an adjacent test form.

13. The test exposure according to claim 12, wherein:
   said first tonal value is approximately 70.0%; and said tonal values of said test areas vary in steps of approximately 0.5% in a range from approximately 65% to approximately 75%.

14. The test exposure according to claim 12, further comprising:
   an edge running in said main scanning direction a width in said secondary scanning direction;
   said test areas being narrower, in said secondary scanning direction, than said width.

15. The test exposure according to claim 12, wherein said test areas and said background area are screened by frequency-modulated screening.

* * * * *